Nov. 7, 1961  R. C. AMERO  3,007,311
AXIAL INTAKE AND EXHAUST TURBINE
Filed July 31, 1959  2 Sheets-Sheet 1
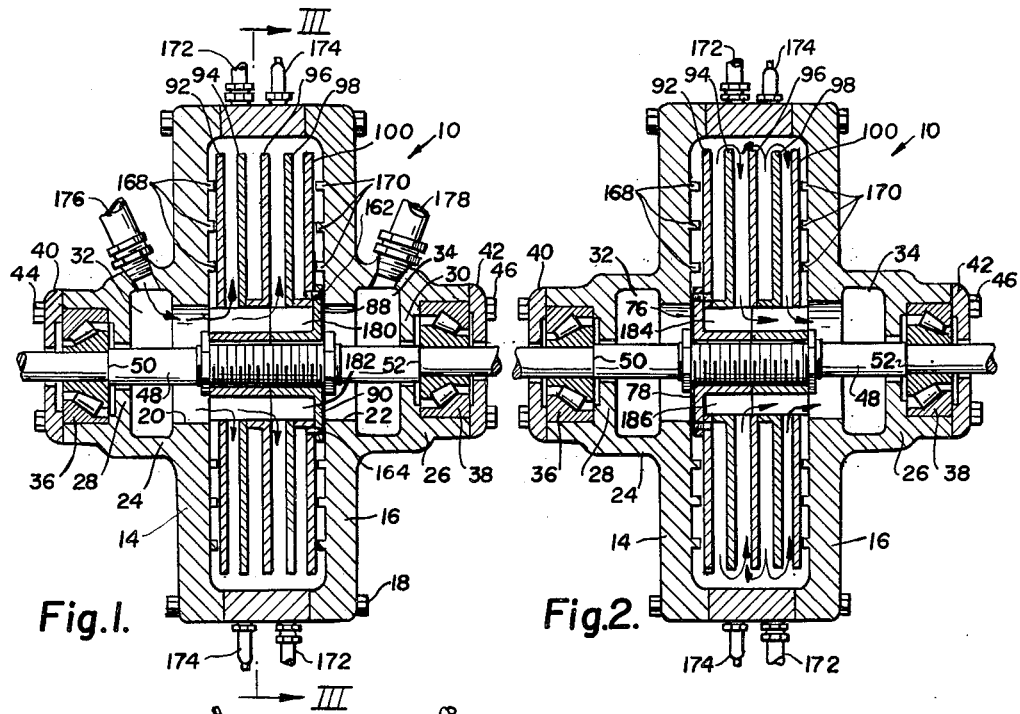
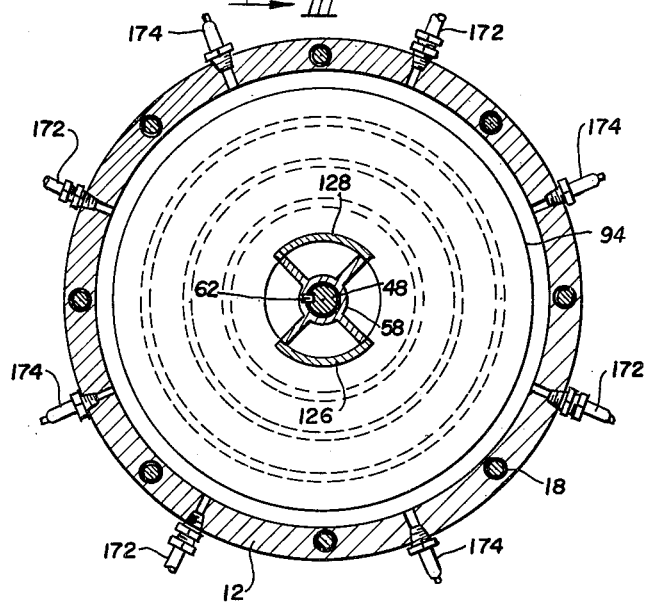
INVENTOR.
*Robert C. Amero*
BY
ATTORNEY Nov. 7, 1961   R. C. AMERO   3,007,311
AXIAL INTAKE AND EXHAUST TURBINE
Filed July 31, 1959   2 Sheets-Sheet 2
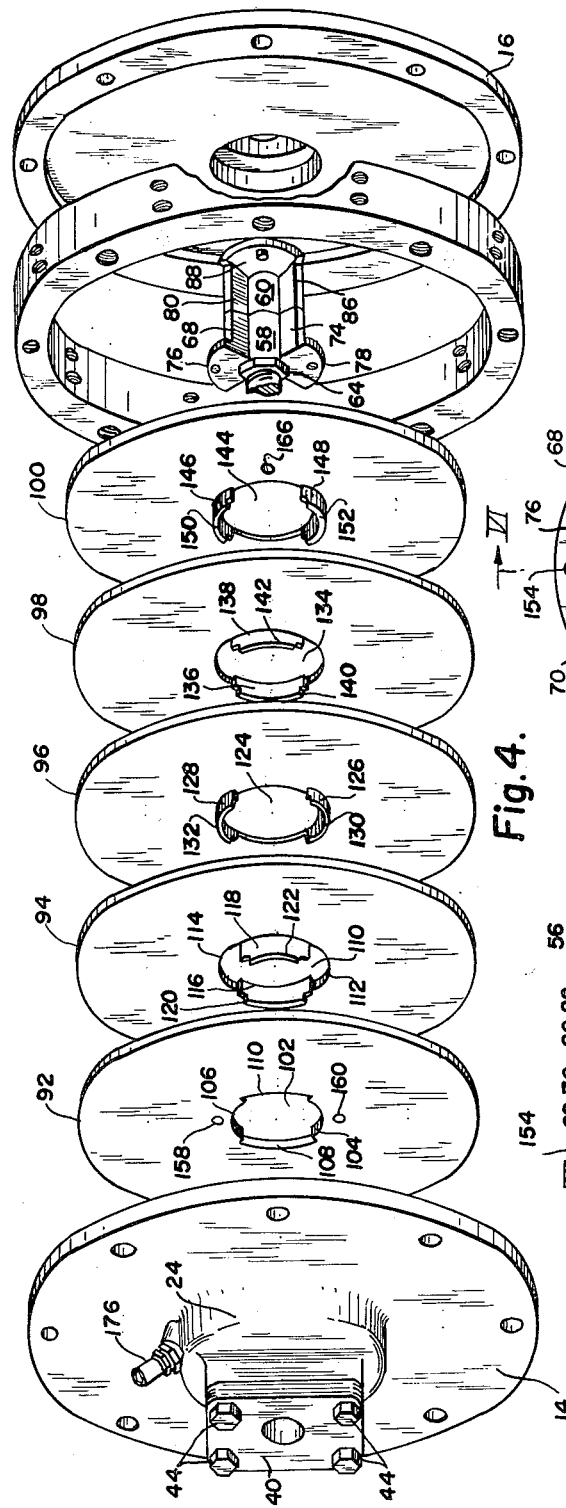
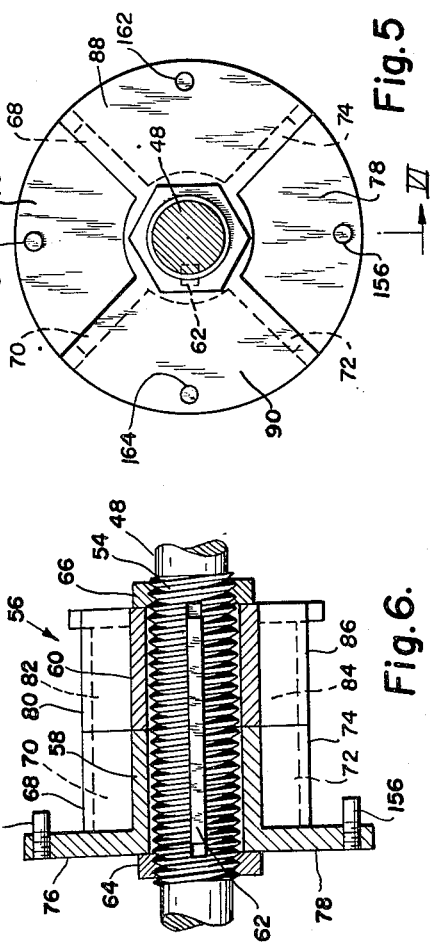
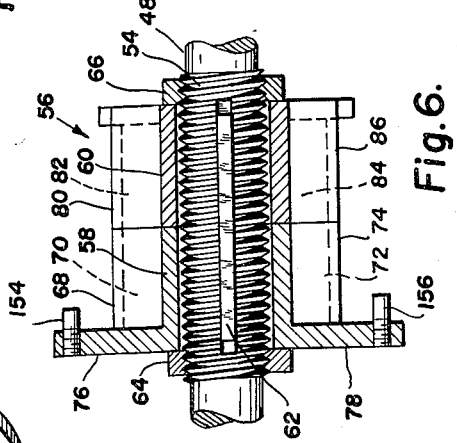
INVENTOR.
Robert C. Amero
BY
ATTORNEY United States Patent Office 3,007,311
Patented Nov. 7, 1961

3,007,311
AXIAL INTAKE AND EXHAUST TURBINE
Robert C. Amero, Glenshaw, Pa., assignor to Gulf Research & Development Company, Pittsburgh, Pa., a corporation of Delaware
Filed July 31, 1959, Ser. No. 830,881
6 Claims. (Cl. 60—39.75)

This invention pertains to new and useful improvements in gas turbines, and more particularly pertains to a gas turbine having axial intake and exhaust manifolds that serve a plurality of axially spaced compressor and driving stages.

Broadly, apparatus according to the invention comprises a plurality of spaced discs coaxially positioned on a hub and secured against rotation about the hub, such discs defining a series of spaces extending along the hub, and a pair of isolated passageways axially disposed in the hub having alternate radial communication with the series of spaces, one of such passageways constituting an intake manifold and the other of such passageways constituting the exhaust manifold.

More specifically, apparatus according to the invention includes a shaft having an even number of circumferentially spaced, radially extending partitions fixed thereto, such partitions extending along the length of the shaft, a plurality of discs each having a central opening, with such discs being spaced and receiving the shaft and the partitions coaxially through their central openings. Also, there are half as many closure members disposed between each adjacent pair of discs as there are partitions, the closure member between each pair of adjacent discs being disposed adjacent the peripheries of their central openings and closing the space between each pair of adjacent discs from radial communication with circumferentially alternate spaces between the partitions. The spaces on opposite sides of each disc are closed from communication with circumferentially alternate spaces between the partitions, and means is provided for preventing rotation of the discs about the shaft.

In further detail, apparatus according to the invention involves alternate compressor and driving stages axially spaced along the shaft, with each driving stage being separated from adjacent compressor stages by the discs defining such compressor stage, and vice versa, whereby heat transfer through the discs from the driving stage to the compressor stages prevents the discs becoming heated to excessively high temperatures.

The invention will be best understood upon reference to the accompanying drawings illustrating the preferred embodiment of the invention, wherein:

FIGURE 1 is a longitudinal vertical sectional view through the turbine;

FIGURE 2 is a longitudinal horizontal sectional view through the turbine;

FIGURE 3 is a transverse sectional view through the turbine taken upon the plane of the section line 3—3 in FIGURE 2;

FIGURE 4 is an exploded perspective view of the gas turbine, with the hub structure being shown assembled on the shaft;

FIGURE 5 is an enlarged end view of the hub assembly; and

FIGURE 6 is a sectional detail view of the hub assembly taken upon the plane of the section line 6—6 in FIGURE 5.

With reference to the drawings, particularly FIGURES 1 and 2, the reference numeral 10 designates the gas turbine engine generally, the same being comprised of a housing constituted of a central hollow cylindrical sleeve 12 disposed between and secured to the peripheral portions of an inlet housing wall 14 and an outlet housing wall 16 by stud bolts 18. The housing walls 14 and 16 are provided with central openings 20 and 22, respectively. Formed integral with and constituting a part of the housing walls 14 and 16 are tubular bosses or projections 24 and 26, respectively, which include inturned ribs 28 and 30 that define distributing chambers 32 and 34 within the housing walls 14 and 16, respectively.

A pair of tapered roller thrust bearings 36 and 38 are disposed within the bosses 24 and 26 and seated against the ribs 28 and 30, respectively, such bearing means being retained in position by annular retaining caps 40 and 42 that are secured by stud bolts 44 and 46.

A shaft 48 extends through the aligned openings 20 and 22 in the housing walls 14 and 16 and through the bearings 36 and 38, as shown, it being noted that the shaft 48 is shouldered, as shown at 50 and 52, so as to bear against the bearings 36 and 38, respectively, and thereby prevent end play of the shaft 48.

Attention is now directed to FIGURES 5 and 6 wherein a hub construction fixed to that portion of the shaft 48 extending between the housing walls 14 and 16 is best shown. The shaft 48 is threaded for an intermediate portion of its length as indicated at 54. A two-piece hub assembly designated generally at 56 is positioned on the threaded portion of the shaft 48, such hub assembly 56 being comprised of abutting cylindrical sleeves 58 and 60 that are longitudinally slidable on the shaft 48, but which are keyed to the shaft 48 by a removable key 62 that is received by keyway slots in the shaft 48 and the sleeves 58 and 60. The sleeves 58 and 60 are retained in abutting relation as well as in adjusted axial position on the shaft 48 for a purpose presently to be described by means of nuts 64 and 66 threaded upon shaft 48. It is to be understood that the nuts 64 and 66 form essentially fluid-tight joints between the shaft 48 and the sleeves 58 and 60. Also, the sleeves 58 and 60 abut in essentially fluid-tight engagement. An even number of partitions 68, 70, 72, and 74 extend radially from and are integral with the sleeve 58. The partitions 68, 70, 72, and 74 terminate at equal distances from the axis of the shaft 48 and extend the entire length of the sleeve 58. At the end of the sleeve 58 remote from the sleeve 60, a pair of end closures 76 and 78 are provided, such end closures being integral with the sleeve 58, with the end closure 76 extending between partitions 68 and 74 and with the end closure 78 extending between the partitions 70 and 72. The end closures 76 and 78 are integral with the partitions to which they are connected. It will be noted that an even number of partitions are provided and that there are half as many end closures as partitions, so that the end closures can be disposed in alternate spaces between partitions. The outer extremities of the end closures 76 and 78 extend outwardly from the axis of the shaft 48 by an amount somewhat greater than the outer extremities of the partitions 68, 70, 72, and 74.

The sleeve 60 is provided with a set of partitions 80, 82, 84, and 86 that are similar to and axially aligned with the partitions 68, 70, 72, and 74, with the two sets of partitions being in abutting and essentially fluid-tight engagement with each other. The partitions 80, 82, 84, and 86 are provided with end closures 88 and 90 at the ends thereof remote from the sleeve 58, end closure 88 connecting between partitions 84 and 86 and end closure 90 connecting between partitions 80 and 82. End closures 88 and 90 are similar to end closures 76 and 78.

A plurality of discs 92, 94, 96, 98, and 100 (see FIGURES 1, 2, and 4) are mounted on the hub structure 56. The disc 92 is provided with a central opening 102 defined by opposing peripheral portions 104 and 106 having a radius equal to the radial extent of the partitions 68, 70, 72, and 74, and 80, 82, 84, and 86, and also defined by opposing peripheral portions 108 and 110 having a somewhat greater radius as clearly shown in FIGURE 4. Disc 94 is provided with a circular opening 110 defined by opposing peripheral portions 112 and 114 having a radius equal to the radius of the previously mentioned peripheral portions 108 and 110 and also defined by flanges 116 and 118 having a radius equal to the radius of the previously mentioned peripheral portions 104 and 106. The flanges 116 and 118 extend axially toward the disc 92, and are provided with tongues 120 and 122, respectively, which are received in the opening 102. The flanges 116 and 118 are set against extremities of the peripheral portions 104 and 106, while the tongues 120 and 122 engage the entire extent of the peripheral portions 108 and 110.

The discs 96, 98, and 100 are, except for one minor exception noted hereinafter with respect to disc 100, identical to the disc 94. The disc 96 has a central opening 124, flanges 126 and 128, and tongues 130 and 132. The disc 98 is provided with a central opening 134, flanges 136 and 138, and tongues 140 and 142. The disc 100 is provided with a central opening 144, flanges 146 and 148, and tongues 150 and 152.

When the discs 92, 94, 96, 98, and 100 are assembled, the discs 92 and 94 are engaged as previously mentioned, and the tongues 130 and 132 of the disc 96 are engaged between the flanges 116 and 118 of the disc 94. In a similar manner, the tongues 140 and 142 of the disc 98 are engaged between the flanges 128 and 130 of the disc 96, with the tongues 150 and 152 of disc 100 being engaged between the flanges 136 and 138 of the disc 98. It will be appreciated that when the discs 92, 94, 96, 98, and 100 are assembled in such a manner, the discs are in axial alignment and are maintained in spaced parallel relation by the flanges 116, 118, 128, 130, 136, 138, 146, and 148. Also, when the discs are so assembled, it will be appreciated that the interlocking arrangement of the tongues prevents rotation of the discs relative to each other. As will be seen presently, the flanges 116, 118, 128, 130, 136, 138, 146, and 148 serve not only the function of spacing the discs 92, 94, 96, 98, and 100, but also serve a function of closing fluid communication between certain portions of the spaces intermediate the discs 92, 94, 96, 98, and 100, and the hub structure 56, and accordingly such flanges can also be termed closure members and are so referred to in certain of the appended claims.

The discs 92, 94, 96, 98, and 100 assembled as described are disposed about the hub structure 56, with the disc 92 being in engagement with the end closures 76 and 78, and with the disc 100 being in engagement with the end closures 88 and 90. The discs 92, 94, 96, 98, and 100 are angularly disposed about the hub structure 56 in such a manner that the flange or closure 118 is in overlapping and essentially fluid-sealing engagement with and extends between the partitions 68 and 74, with the flange or closure 116 bearing a similar relation to the partitions 70 and 72. In an analogous manner, flange or closure 128 extends between partitions 68 and 70; flange or closure 126 extends between partitions 72 and 74; flange or closure 136 extends between partitions 82 and 84; flange or closure 138 extends between partitions 80 and 86; flange or closure 146 extends between partitions 80 and 82; and flange or closure 148 extends between partitions 84 and 86. The discs 92, 94, 96, 98, and 100 are retained in the above-described assembled relation on the hub structure 56 by means of fastening pins 154 and 156 that are threaded through the end closures 76 and 78, respectively, and enter openings 158 and 160 provided in the disc 92. In a similar manner, fastening pins 162 and 164 secure the end closures 88 and 90 to the disc 100, the disc 100 being provided with openings such as that indicated at 166 in FIGURE 4 for this purpose. The overall length of the hub structure 56 is such that the end closures 76 and 78 bear against the disc 92, with the end closures 88 and 90 bearing against the disc 100.

Referring now to FIGURES 1 and 2, it will be seen that the housing wall 14 is provided with a plurality of upstanding annular ribs 168 which terminate in closely spaced relation to the disc 92 so as to constitute a seal effectively preventing appreciable radial movement of fluids in the space intervening between the wall 14 and the disc 92. In a similar manner, the wall 16 includes a plurality of upstanding annular ribs 170 that terminate in closely spaced relation to the disc 100 for a similar purpose.

A plurality of fuel injection nozzles 172 are circumferentially spaced about the periphery and extend through the cylindrical sleeve 12, whereby fuel can be introduced into the turbine 10. A plurality of spark plugs or igniters 174 are circumferentially spaced about and extend through the sleeve 12. The individual spark plugs or igniters 174 are preferably disposed adjacent individual fuel inlet nozzles 172, and the relative positions of the nozzles 172 and the igniters 174 are alternated as shown so that both of such elements are staggered. An air inlet conduit 176 is provided for the chamber 32, and an exhaust conduit 178 is provided for the chamber 34.

The described structure admits of a unique travel path for fluids entering the conduit 176 and exiting from the turbine 10 through the conduit 178. Fluid introduced through the conduit 176 passes into the chamber 32 and thereupon enters the spaces hereinafter referred to as passageways 180 and 182 between the partitions 68 and 74, 80 and 86, 70 and 72, and 82 and 84, it being noted that entry into the spaces hereinafter referred to as passageways 184 and 186 between the partitions 68 and 70, 80 and 82, 72 and 74, and 84 and 86 is denied by the end closures 76 and 78. On the other hand, it will be noted that the passageways 184 and 186 communicate with the chamber 34, whereas the passageways 180 and 182 are denied communication with the chamber 34 by the end closures 88 and 90.

The space between the discs 92 and 94 has free communication with the passageways 180 and 182, but such space is denied communication with the passageways 184 and 186 by the closures 116 and 118. The space intervening between the discs 94 and 96 has free communication with the passageways 184 and 186, but such space is denied communication with the passageways 180 and 182 by the closures 126 and 128. The space intervening between the discs 96 and 98 has communication with the passageways 180 and 182, but such space is denied communication with the passageways 184 and 186 by the closures 136 and 138. The space intervening between the discs 98 and 100 has free communication with the passageways 184 and 186, but such space is denied communication with the passageways 180 and 182 by the closures 146 and 148. Accordingly, it will be seen that the sole fluid path afforded through the turbine 10 comprises fluid entering the passageways 180 and 182 from the chamber 32 passing radially and outwardly through the spaces between the discs 92 and 94 on the one hand, and between discs 96 and 98 on the other hand. Fluid having passed radially and outwardly to the peripheries of the discs as described is thence free to pass radially and inwardly between the discs 94 and 96 on one hand, and between discs 98 and 100 on the other hand, so as to enter the passageways 184 and 186 and thence pass into the chamber 34 and out the conduit 178.

The operation of the turbine 10 will now be quite easily understood. Air is introduced to the turbine 10 through the conduit 176, while fuel, either gaseous or preferably a liquid fuel, in the form of a spray, is introduced into the turbine 10 through the nozzles 172. The fuel is ignited electrically by means of the spark plugs or igniters 174, the latter being used to ignite combustion on starting the turbine 10 and, if deemed necessary or desirable, can operate either intermittently or continuously in order to assure sustained fuel combustion. The air traveling radially and outwardly from the passageways 180 and 182 is compressed during its travel to the periphery of the discs due to centrifugal action on rotation of the shaft and discs, and during such travel serves to cool the surfaces of the discs between which it travels. Upon the compressed air reaching the periphery of the discs and the vicinity of the sleeve 12, the same is mixed with fuel entering through the fuel nozzles 172 and supports the combustion of the latter. The heated and expanding gaseous combustion products thence travel radially and inwardly along a spiral path between the discs to the passageways 184 and 186 so as to impart torque to the discs, and thence are discharged from the turbine 10 through the chamber 34 and the conduit 178. It will, of course, be appreciated that operation of the turbine 10 requires that the shaft 48 and the discs carried thereby be rotating so that the necessary compression of incoming air will be realized. Hot expanding products resulting from the combustion of the fuel with the compressed and rotating air in the region of the periphery of the discs spiral inwardly toward the shaft 48 and deliver torque to the discs between which the hot gases pass, thereby to deliver useful output torque to the shaft 48.

The turbine 10 can operate with equal facility in either a forward or reverse direction solely dependent upon the direction of rotation imparted to the shaft 48 upon setting the turbine 10 in operation. An external source of motive power such as an electric motor or the like (not shown) can be employed to rotate the shaft 48 on starting the turbine 10.

All that is required in starting the turbine 10 is to impart rotation to the shaft 48 by an external power source, and during such rotation, initiate the introduction of fuel through the nozzles 172 and activate the spark plugs or igniters 174. Air can be supplied under a slight pressure initially through the conduit 176 to establish an initial motion of air through the turbine 10. As soon as combustion has commenced, the application of external motive power can be discontinued, and there is no further necessity for forcibly introducing air through the conduit 176 though the latter can be continued if desired. It will be understood that fluids will continue to flow through the turbine 10 in the direction indicated by the arrows in FIGURES 1 and 2 by virtue of the radially and outwardly moving intake air being relatively cool and dense as compared to the radially and inwardly moving combustion products. The discs 94, 96, and 98 each serve dual functions in that one side of each of said discs serves to compress incoming air while the other side of each of such discs serves as a turbine with respect to the combustion products.

Not only can the turbine 10 be operated in either a forward or reverse direction with equal facility as mentioned previously, but the flow of fluids through the turbine 10 can also be reversed with substantially equal facility, in which case the conduit 178 can serve as an air inlet and the conduit 176 can serve as exhaust. The direction of the passage of fluids through the turbine 10 is determined by the direction with which fluids are initially caused to flow through the same on starting the turbine 10.

It will be noted that in operating the turbine 10 with the direction of fluids being such as indicated by the arrows shown in FIGURES 1 and 2, all of the discs, with the exception of disc 100, are in contact with incoming relatively cool air so that overheating of such discs is greatly reduced. Operating the turbine 10 so that direction of fluid movement therethrough is opposite to that indicated by the arrows affords the advantage of prolonging the useful life of the disc 100 by allowing the latter to be cooled and only the disc 92 to be solely in contact with hot combustion gases.

Though not necessary, the discs 92, 94, 96, 98, and 100 can be provided with conventional vanes if desired, which can be either of the conventional radial and linear type, or spiral configuration. The simplicity of the discs 92, 94, 96, 98, and 100 affords simple and inexpensive fabrication, it being noted that the flanges or closures associated with the discs can be integral therewith and simply struck outwardly therefrom from a flat blank by a stamping operation in manufacture. Also, the hub structure 56 by virtue of the separable construction thereof allows efficacious disassembly and assembly of the discs. The axial adjustability of the hub structure 56 on the shaft 48 by virtue of the nuts 64 and 66 enables relatively simple adjustment to be made as to the spacing of the discs 92 and 100 with respect to the sealing ribs 168 and 170.

It is also within the purview of the invention that fuel can be premixed by any desired carburetion process with the air introduced into the inlet conduit 176 of the turbine, in which instance the fuel injector nozzles 172 need not be used or can be dispensed with.

The housing comprised of the cylinder 12 and the walls 14 and 16 is preferably made of a heat resistant alloy such as stainless steel, "Inconel," or the like, and can optionally be coated on the interior with a refractory ceramic coating. The hub structure and the discs are also preferably made of a heat resistant alloy such as stainless steel or "Inconel," with stainless steel being particularly well suited for the discs as such alloys readily lend themselves to fabrication of the discs by stamping or similar manufacturing processes. Such material will also allow the discs, though not so illustrated, to be stamped in a corrugated fashion in which the valleys and ridges extend radially, either straight or in a spiral manner.

Among the chief advantages of the turbine is its overall simplicity and the simplicity of its individual components, and the accompanying low cost and especially the ease with which it can be disassembled, parts repaired or replaced, and reassembled. Also very important is the cooling function served by incoming air which holds down the temperature of components so that higher operating combustion temperatures and thermal efficiencies can be realized without incurring structural damage. The flexibility of the turbine as to direction of rotation, as well as to the interchangeability of the inlet and outlet connections, is also a substantial advantage.

It is believed that the preceding description of the preferred embodiment of the invention is sufficiently detailed to afford a ready appreciation of the principles involved and the advantages attendant thereto. Since the structure has been described in substantial detail for the purpose of affording a full and complete understanding thereof rather than for the purpose of implying any restriction in inventive scope, attention is directed to the appended claims in order to ascertain the actual scope of the invention.

I claim:

1. Apparatus comprising a shaft, an even number of circumferentially spaced, radially extending partitions carried by the shaft, said partitions also extending along the length of the shaft, a plurality of discs each having a central opening, said discs being spaced and receiving the shaft and the partitions coaxially through their central openings, half as many closure members disposed between each adjacent pair of discs as there are partitions, the closure members between each pair of adjacent discs being disposed adjacent the peripheries of their central openings and closing the space between each pair of adjacent discs from radial communication with circumferentially alternate spaces between the partitions, with the spaces on opposite sides of each disc being closed from communication with circumferentially alternate spaces between the partitions, and means for preventing rotation of the discs about the shaft.

2. The combination of claim 1, wherein the closure members between each pair of discs are constituted of flanges that are integral with one of such discs and are in separable engagement with the other of such discs.

3. Apparatus comprising a hub, an even number of circumferentially spaced, radially extending partitions carried by the hub, a plurality of discs each having a central opening, said discs receiving the hub and the partitions coaxially through their central openings, half as many closure members disposed between each adjacent pair of discs as there are partitions, the closure members between each pair of adjacent discs being disposed adjacent the peripheries of their central openings and closing the space between each pair of adjacent discs from radial communication with circumferentially alternate spaces between the partitions, with the spaces on opposite sides of each disc being closed from communication with circumferentially alternate spaces between the partitions, as many end closures as there are partitions, said end closures being alternately disposed adjacent the opposite ends of the hub and connected between successive pairs of partitions about the circumference of the hub, each of said end closures being in peripheral engagement with one of the discs, and means for preventing rotation of the discs relative to the hub.

4. Apparatus comprising a housing having a shaft mounted therein for rotation, a hub in the housing mounted on the shaft, an even number of circumferentially spaced, radially extending partitions carried by the hub, a plurality of discs each having a central opening, said discs receiving the hub and the partitions coaxially through their central openings, half as many closure members disposed between each adjacent pair of discs as there are partitions, the closure members between each pair of adjacent discs being disposed adjacent the peripheries of their central openings and closing the space between each pair of adjacent discs from radial communication with circumferentially alternate spaces between the partitions, with the spaces on opposite sides of each disc being closed from communication with circumferentially alternate spaces between the partitions, as many end closures as there are partitions, said end closures being alternately disposed adjacent the opposite ends of the hub and connected between successive pairs of partitions about the circumference of the hub, each of said end closures being in peripheral engagement with one of the discs, means for preventing rotation of the discs relative to the hub, said housing having openings adjacent opposite ends of the hub, and means for restricting radial fluid flow in the spaces intermediate the housing and the remote faces of the end discs.

5. The combination of claim 4 including a plurality of circumferentially spaced fuel inlet nozzles in the housing adjacent the periphery of the discs, said nozzles being axially staggered, and an electrical igniter axially adjacent each nozzle, with said igniters also being staggered and on alternate sides of the nozzles.

6. Apparatus comprising a casing, a rotatable hub extending axially through said casing, a plurality of spaced discs coaxially positioned on the hub within said casing and secured against rotation about the hub, said discs defining a series of spaces extending along the hub, a pair of independent axial passageways each having access to the exterior of the casing extending along the hub, one of said passageways having openings only into alternate spaces of said series of spaces and the other of said passageways having openings only into the other spaces in said series of said spaces.

References Cited in the file of this patent

UNITED STATES PATENTS

| 1,210,831 | Pfeiffer | Jan. 2, 1917 |
| 1,455,022 | Dake | May 15, 1923 |

FOREIGN PATENTS

| 439,542 | France | Apr. 6, 1912 |
| 650,393 | Great Britain | Feb. 21, 1951 |